June 7, 1960  E. F. POHL  2,939,512
LEVEL RIDE TRACTOR SEAT FRAME
Filed Jan. 21, 1958  2 Sheets-Sheet 2
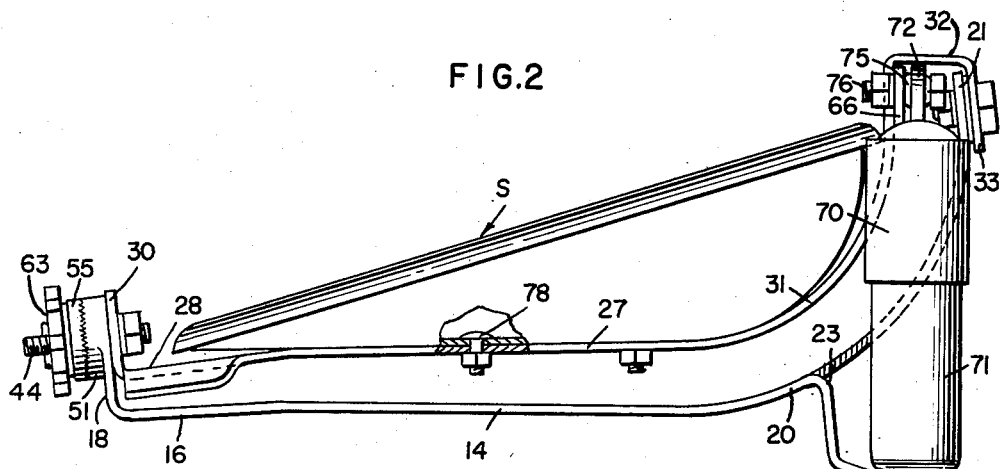
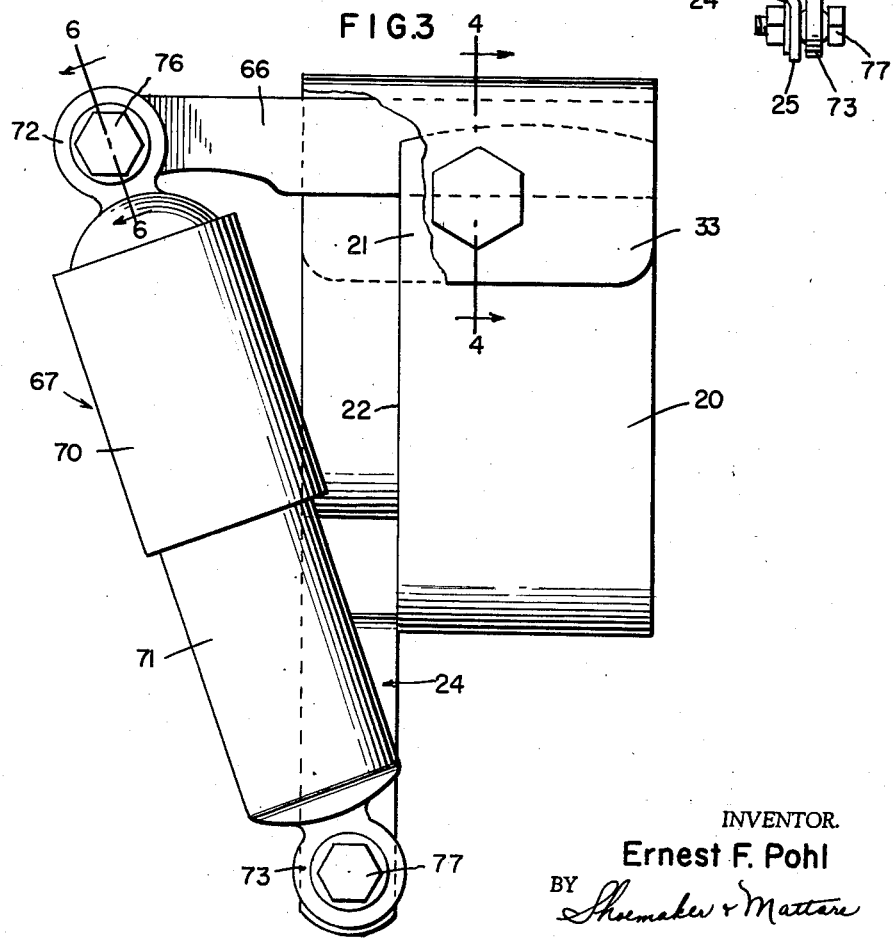
INVENTOR.
Ernest F. Pohl
BY Shoemaker + Mattare
ATTYS.

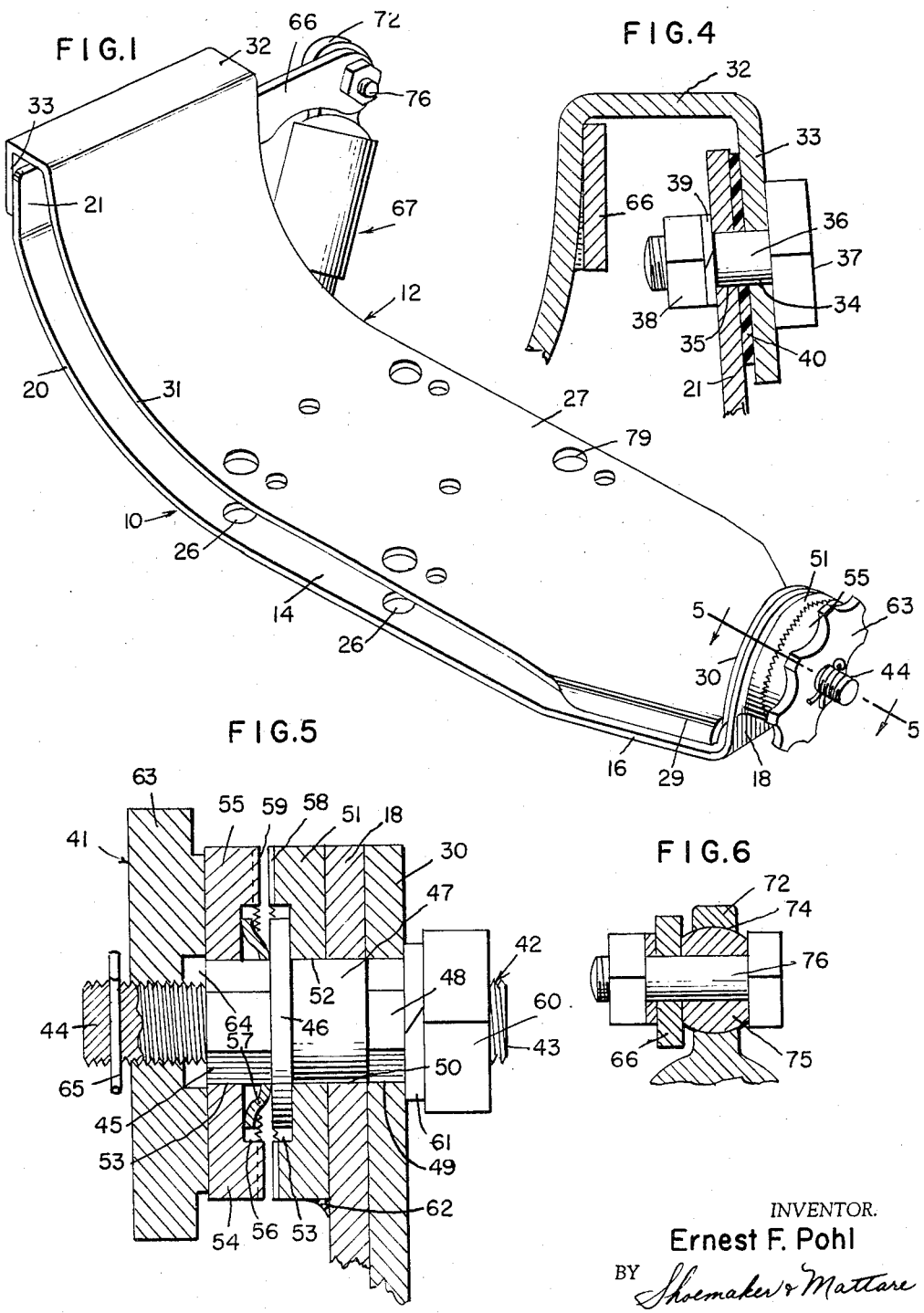

United States Patent Office 2,939,512
Patented June 7, 1960

2,939,512

LEVEL RIDE TRACTOR SEAT FRAME

Ernest F. Pohl, 39—25 51st St., Woodside, N.Y.

Filed Jan. 21, 1958, Ser. No. 710,259

14 Claims. (Cl. 155—5)

This invention relates generally to the class of chairs and seats and is directed particularly to improvements in seat structures for tractors and other types of machinery wherein it is desirable that a means be provided whereby the seat occupied by an operator of the machine may be kept substantially level regardless of the character of the terrain over which the machine is operating.

In the operation of tractors and other heavy equipment such as earth working machines and the like, the seat for the rider is conventionally secured so that it has no movement relative to the supporting under-structure. This fact seriously affects the comfort of the rider or operator of the vehicle. Because of the fact that such seats cannot be adjusted as to level, it will be apparent that when the machine is operating on terrain which does not remain level, the rider of the seat in order to keep his body substantially upright, must continuously change his position or incline his body as the surface of the ground changes from flat to sloping and vice versa. This is very tiring and results in great physical strain when it is realized that operators of such machines usually occupy the machine seat for many hours at a time.

It is an object of the present invention, in view of the foregoing, to provide a new and novel tractor seat supporting frame which is so designed that the occupant can alter the lateral inclination of the seat in accordance with a slope along which the carrying vehicle is traveling so that while the vehicle and a part of the seat supporting structure may be at an inclination, the seat itself can be maintained level.

Another object of the invention is to provide in a tractor seat supporting structure adapted to facilitate the placing of a supported seat in the most advantageous position for the occupant, a readily manipulated means for securing the seat in the selected position so that it will maintain such position during the operation of the vehicle over a particular surface area.

Still another object of the invention is to provide in a tractor seat supporting structure a fixed frame having a seat cradle supported thereon for turning movement on a longitudinal axis, with a movement equalizing coupling between the frame and the seat cradle which limits the rate of turning of the cradle with respect to the underlying frame so that desired equalization between the frame and seat is gradually and smoothly produced, the seat supporting cradle and frame further having therebetween a means for locking the two in selected positions of adjustment.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 1 is a view in perspective of the tractor seat frame and cradle structure of the present invention shown detached from the conventional underlying support and without the seat pan in position thereon, the view further illustrating the fixed frame and seat-carrying cradle in normal positions for level riding over a level ground surface;

Fig. 2 is a view in side elevation of the structure shown in Fig. 1 showing the seat pan in position on the seat cradle, with portions of the structure broken away to show connection details between the pan and the cradle, the view being taken from the left side of the structure as it is shown in Fig. 1;

Fig. 3 is a view in rear elevation on an enlarged scale showing the equalizer connections between a fixed outer frame and the rockable seat pan supporting frame;

Fig. 4 is a sectional view taken substantially on the line 4—4 of Fig. 3;

Fig. 5 is a sectional view taken in a vertical plane through the front end of the structure approximately on the line 5—5 of Fig. 1;

Fig. 6 is a detail section taken substantially on the line 6—6 of Fig. 3.

Referring now more particularly to the drawings wherein like numerals of reference designate corresponding parts in the several views, it will be seen upon reference to Figs. 1 and 2 particularly that the structure of the present invention embodies a lower or outer base frame which is generally designated 10 and an upper frame generally designated 12 which will be more particularly identified as the seat pan supporting cradle. These two frames or this lower frame 10 and upper frame or cradle 12 are pivotally coupled together for relative rocking movement as will be hereinafter more particularly set forth.

The fixed outer frame 10 comprises an elongate relatively wide plate body having a straight central portion 14 and a slightly tapered forward end portion 16 which joins an upwardly and forwardly inclined ear 18. The central portion 14 merges with and forms an integral continuation of a rearwardly and upwardly curved back portion 20 which terminates in a flat top back plate 21.

A section of the upwardly curving rear portion 20 and of the back plate 21 is cut away on the vertical line 22 to obtain a narrow strip of the metal which is bent down as at 23 and angled or shaped to form the depending bracket 24. This bracket 24 terminates in the short straight downwardly directed end part 25 which is set forwardly of the plane of the back plate 21 and which supports one end of the hereinafter described equalizer unit.

The lower or outer frame 10, in the use of the device, is fixed to the supporting machine by being mounted by bolts or the like extended through openings 26 in the flat central portion of the plate, upon the conventional seat supporting standard, not shown, or upon any other suitable supporting body. Consequently it will be understood that when the seat supporting structure is mounted for use, this outer or lower frame 10 will always move with the underlying supporting structure or with the machine, that is, when the machine is traveling on level ground the frame 10 will be level and when the machine travels on sloping ground the frame will assume the same inclination as the rest of the supporting machine, that is, either a lateral inclination or a fore and aft inclination.

The upper frame or seat cradle 12 also comprises an elongate relatively wide plate of approximately the same length as the outer frame 10 and also preferably of substantially the same width through the major portion of its length. This cradle plate embodies the long flat central portion 27 corresponding to the portion 14 of the lower or outer frame which has the tapered forward end portion 28 bordered by the down-turned flanges 29. This tapered forward end portion 28 also is slightly downwardly and forwardly inclined as is also the tapered forward end portion 16 of the outer frame plate 14, and merges with the upwardly and forwardly inclined ear 30, the forward face of which bears against the rear face of the up-turned ear 18 of the outer frame.

The mid section or central portion 27 of the cradle plate is extended upwardly and rearwardly in the widely curved portion 31 which has approximately the same curvature as the portion 20 of the outer or lower frame as shown in Fig. 2, and the top of this curved portion 31 joins a rearwardly extending horizontal wall 32 which overlies or covers the top of the plate 21 and joins the downwardly and rearwardly extending flange 33. This flange 33 is in spaced relation with the upper end of the upwardly curved portion 31 and also lies across the rear face of the plate 21, as shown most clearly in Figs. 2 and 3.

The flange 33 and the upturned plate 21 have the aligned bolt apertures designated respectively 34 and 35 through which is extended the shank 36 of a short headed bolt 37 the head of which is positioned against the rear side of the flange 33 while the threaded end of the shank receives thereon the nut 38 which bears against a lock washer 39 lying against the forward face of the plate 21.

Encircling the shank 36 and interposed between the flange 33 and plate 21 is a composition friction washer 40 formed of plastic or other suitable material and when the nut 38 is drawn up tightly on the shank 36 the flange 33 and plate 21 will be drawn together into compressing relation with the washer 40 so that the parts will be effectively held against relative turning movement.

The adjacent upturned ears 18 and 30 are releasably locked together by a locking unit which is generally designated 41. This locking unit comprises a stud, generally designated 42, which is formed with the two threaded terminal shanks 43 and 44 and intermediate portions of larger diameter which comprise the hexagonal portion 45 adjacent to the stud 44, the collar 46 of materially greater diameter than the portion 45 and of circular form, the circular hub 47 which is next to the collar 46, and the rear hexagonal portion 48 which joins the hub 47 and which is connected directly with the threaded rear shank portion 43.

The rear hexagonal portion 48 is press fitted in a correspondingly formed or shaped opening 49 in the ear 30 of the cradle plate while the hub 47 has a portion lying in a circular opening 50 in the ear 18 which is integral with the outer frame plate 14.

Disposed against the forward side of the ear 18 is a locking disc 51 which has the central opening 52 receiving a portion of the hub 47 and this disc has the rearwardly directed face thereof formed with a shallow recess 53 in which the collar 46 is located.

The hexagonal portion or nut 45 engages slidably in a correspondingly formed opening 54 through the center of the disc washer 55. This disc washer 55 opposes the fixed disc 51 and has in the face opposing the disc 51 a recess 56 in which is positioned an annular spring 57 which encircles and rests upon the hexagonal nut portion 45 and projects from the recess 56 against the adjacent face of the collar 46.

The opposing faces of the discs 51 and 55 are provided with the radial teeth or ribs 58 and 59 which interlock when the washer 55 is shifted rearwardly on the hexagonal nut portion 45 against the resistance of the spring 57.

The rear threaded shank 43 carries the nut 60 which has interposed between it and the hexagonal nut 48 a lock washer 61. This nut 60 when drawn up presses the lock washer 61 against the hexagonal nut portion 48 and also draws the collar 46 rearwardly to maintain the ears 18 and 30 in contacting relation.

The disc 51 is rigid with the ear 18, being welded thereto as indicated at 62, or secured to the ear in any other suitable manner so that these two parts are immovably connected together on the circular hub 47.

Threaded upon the forward shank 44 of the stud is a hand lever or hand wheel 63 which bears against the slidable washer disc 55 and which has the face engaging the disc 55 provided with a recess 64 to receive the forward end portion of the nut 45 when the wheel is threaded rearwardly against the washer 55.

The forward movement of the wheel or lever 63 is limited by suitable means such, for example, as the cotter key 65 extended through a suitable opening in the shank 44.

It will be seen from the foregoing that when the wheel or lever 63 is threaded rearwardly on the shank 44, the spring 57 will be compressed and the teeth 58 and 59 will be interengaged so as to prevent relative turning between the discs. However, when the wheel 63 is backed off to permit the spring 57 to disengage the discs, relative turning will be permitted between the ears 18 and 30 so that the seat pan supporting cradle 12 may be turned with respect to the fixed underlying frame 10.

Rigidly secured to the rear face of the upwardly curved portion 31 of the seat cradle is one end of a laterally extending arm 66, the other end of the arm extending outwardly on the side of the structure on which the depending bracket 24 lies.

Connected between the bracket 24 and the end of the overlying arm 66 is an equalizer unit which is generally designated 67 and by means of which the turning or swinging of the cradle 12 on the pivots, comprised of the bolt shank 36 and stud 42, is controlled.

This equalizer unit is of a standard construction and accordingly no detailed illustration or description of the interior mechanism is given. The structure of the interior mechanism for this equalizer is fully disclosed in Patents 2,369,007; 2,394,356; 2,507,267 and 2,518,553. The exterior aspect of this equalizer shows two relatively movable parts 70 and 71 which are telescoped one into the other, and which at their outer ends carry the attachment ears 72 and 73 respectively, each of which has an aperture therethrough which, as illustrated in Fig. 6, has a curved interior surface 74 which conforms to the curvature of a spherical body 75, which has extended therethrough the bolt 76 which couples it with the adjacent end of the arm 66. At the bottom end of the equalizer unit the coupling ear 73 is likewise attached to the depending portion 25 of the bracket 24 by the bolt 77, which passes through a spherical body corresponding to the body 75 and mounted in the ear 73.

This equalizer unit, as shown in Fig. 2, is disposed in a substantially vertical plane which is perpendicular to the length of the seat supporting construction, but inclines outwardly as shown in Figs. 1 and 3. The connections between the ears 72 and 73 and the respective attaching members 66 and 25 form universal joints which permit the necessary oscillation of the seat supporting cradle 12 relative to the underlying outer or lower frame 10. Due to the fact that the arm 66 extends a substantial distance outwardly or laterally of the construction beyond the bracket 25, it will be seen that when the cradle body 12 turns about the pivot bolt 37, the outer end of the arm can swing down or up to move the upper part 70 of the equalizer relative to the lower part thereof without any binding action which would create a resistance to such movement.

The reference character S generally designates a conventional seat pan such as is used on tractors and other heavy duty machinery, and this pan has its bottom resting directly upon the flat mid portion 27 of the seat cradle and is secured thereto by suitable bolts 78 engaged through the apertures 79 in the cradle or any other suitable means may be employed for securing the seat pan to the cradle.

From the foregoing it will be seen that the tractor seat supporting frame construction provides a means by which the seat pan may be readily fixed in a desired position if and when such fixing is considered desirable, or where it may be desired to provide for the turning of the seat pan and supporting cradle with respect to the underlying frame 10 so as to maintain the seat pan level at all times regardless of the inclination of the frame 10, the locking connection between the parts 10 and 12 can be released so that the desired relative movement between the parts and the placing of the seat pan in the desired level position can take place. When such adjustment of the connections between the cradle 12 and the underlying frame may become desirable in the use of the structure, the nut 38 on the pivot bolt shank 36 is backed off so as to lighten the friction between the parts 21 and 33 and the interposed washer 40. The hand lever or wheel 63 may then be easily adjusted by the occupant of the seat to disengage the clutching faces of the discs 51 and 55 and the cradle and pan thereon may then be shifted or turned on the bolt 37 and stud 42 to the desired extent. If after making the necessary adjustment the occupant of the seat desires to fix the seat in the adjusted position, this is accomplished by screwing up the wheel 63 so as to force the clutching or toothed faces of discs 51 and 55 into engagement with one another against the resistance of the interposed spring 57.

When the locking connection or clutching connection between the discs 51 and 55 is released for the swinging of the seat cradle 12, the equalizer unit 67 functions to restrain the cradle against rapid swinging, but permits the swinging or turning of the cradle slowly so that the occupant of the seat can easily secure the seat when the desired level position has been reached.

While the device illustrated and described is shown with a means for maintaining a locking connection between the two elongate members, it will be appreciated that this construction may be employed with only a pivot between the upturned ears at the forward end so that the upper member upon which the seat pan is secured will be free to move or swing as may be necessary to maintain the same and the seat pan level as the supporting vehicle travels over terrain which may constantly change as to its level. Without the locking means, the stud 42 may function as the pivot support or any other suitable pivot stud may be substituted for the one here shown, as may be found necessary.

If the upper and lower members are employed with an unrestricted pivotal coupling between their adjacent ends, the equalizer unit would, of course, function constantly to restrain the upper or seat pan supporting member from too free or rapid turning or swinging. In other words, the pivotal adjustment of the upper member and the seat pan would, because of the equalizer unit, take place gradually or in a controlled manner.

The claims:

1. A level ride tractor seat adapter to be interposed between a seat support and a tractor seat, said adapter comprising two superposed elongate elements substantially coextensive in length, the lower member being constructed to be secured to the seat support, the upper member being constructed to have a tractor seat secured thereon, means forming a two-point pivotal suspension of the upper member on the lower member, said suspension points being at the ends of the members and facilitating the rocking of one member relative to the other on longitudinally directed axis, and means at one end of the construction for effecting the locking of the members together.

2. The invention according to claim 1, with an elongate movement stabilizing unit at the back end and laterally of the adapter and having relatively movable end portions, and means forming universal pivotal connections between the said end portions and the said upper and lower members.

3. The invention according to claim 2, wherein the pivotal coupling between the upper member and the adjacent end portion of said stabilizing unit is disposed laterally of the adapter a substantially greater distance than the pivotal coupling between the lower member and the adjacent end portion of the unit.

4. A level ride tractor seat adapted to be interposed between a seat support and a tractor seat, said adapter comprising two superposed elongate members, the lower member being constructed to be secured to the seat support, the upper member being constructed to have a tractor seat secured thereon, said members carrying upstanding juxtaposed pivot elements at one end, a pivot stud coupling said elements for relative turning on an axis extending longitudinally of the members, manual means on said stud adapted for locking said elements against relative turning, and a pivot coupling between the members at the other ends thereof having a turning axis extending longitudinally of the members.

5. In a level ride tractor seat supporting construction, an elongate lower member adapted to be secured to a support and having an upwardly curving back portion and an upstanding ear at its forward end, an elongate upper member adapted to carry a sitter and having an upwardly curving back portion and an upstanding ear at its front end in juxtaposed relation with the upstanding ear of the lower member, a pivot coupling between the upper ends of the upwardly curving back portions of the two members facilitating relative turning of said portions on a longitudinally extending axis, a pivot stud passing through said juxtaposed upstanding ears for relative turning of said ears on an axis extending lengthwise of the members, said stud being fixed to one of said ears against turning movement relative thereto and having the other ear connected therewith for turning movement on the stud, the stud having a forward threaded end, a hand lever threaded on said end of the stud and means carried on the stud between the hand lever and an adjacent ear whereby locking coupling may be effected between the ears by and upon turning movement of the hand lever to thread the same in one direction on the stud.

6. The invention according to claim 5, wherein said locking coupling means embodies a pair of opposing disc members one of which is rigidly secured to that ear which has free turning movement on the stud, the other one of said disc members being supported on the stud for axial movement thereon and being held against turning movement on the stud, the opposed faces of said discs being toothed for interlocking connection when the discs are moved together.

7. The invention according to claim 6, with a spring means interposed between the discs and adapted to be placed under tension when the discs are moved into locking connection one with the other whereby upon the backing off of the hand lever on the threaded portion of the stud the reaction of the tensioned spring will effect the separation of the discs.

8. The invention according to claim 5, wherein the said upwardly curving back portion of the upper member has a rearwardly and downwardly extending terminal part, said terminal part being disposed across the rear side of the upwardly curving back portion of the lower member, and the said pivotal coupling between the upwardly curving back portions comprising a bolt passing through said downwardly extending part and the adjacent end of the back portion of the lower member, and a friction element on the bolt and interposed between said part and said lower member back portion.

9. The invention according to claim 8, with an arm secured to the upwardly curving back portion of the upper member and extending a substantial distance laterally therefrom, a downwardly extending bracket secured to the lower member at the side thereof adjacent to the outwardly extending end of the arm, the bracket having an end portion disposed substantially in the vertical plane of and at an elevation below the outer end of the arm, and an elongate stabilizer unit having upper and lower ends and operatively connected respectively at its upper and lower ends to the outer end of the arm and to said bracket for controlling oscillation of the upper member relative to the lower member.

10. A level ride tractor seat adapter to be interposed between a seat support and a tractor seat, said adapter comprising two superposed elongate members, means for securing the lower member to the seat support, means for mounting and securing a tractor seat on the upper member, a two point pivotal suspension of the upper member upon the lower member, said suspension points being adjacent to the ends of the members and constructed for rocking one member relative to the other on axis directed longitudinally of the members.

11. The invention according to claim 10, wherein both of said members have an upwardly curving back end portion, the lower member having a longitudinal edge strip thereof bent down therefrom forming a bracket, an arm secured to and extending laterally from the top an upturned end portion of the upper member at the side thereof adjacent to the bracket, and a stabilizing coupling between said bracket and the outer end of the arm adapted to restrain the members against a rapid rocking motion one relative to the other.

12. In a level ride tractor seat structure, in combination, a seat body, a pair of superposed elongate members substantially coextensive in length, said members being of an over-all length greater than the seat, the seat being secured on the upper member between the ends thereof, means forming a two-point pivotal suspension of the upper member on the lower member at the ends of the members and adapted for the rocking of the upper seat carrying member on a longitudinally directed axis, and means for locking the pivot suspension means between the pair of members at one end of the same.

13. The invention according to claim 12, wherein the said one end of the members is the front end and the members at the front end have substantially right angularly extending terminal portions forming a part of the pivotal suspension at the said one end.

14. The invention according to claim 12, wherein the pivotal suspension and locking means at said one end of the pair of members comprises an angular extension carried by each member, the extensions lying one against the other, a pivot pin passing through the extensions and fixed at one end to one only of the extensions against rotation, a hand lever threaded upon the other end of the pivot pin, and opposed members on the pivot pin between the hand lever and the other one of the extensions for relative movement into engagement one with the other upon rotation of the threaded hand lever in one direction on the threaded pivot pin.

References Cited in the file of this patent

UNITED STATES PATENTS

| | | |
|---|---|---|
| 224,905 | Hedges et al. | Feb. 24, 1880 |
| 420,430 | Banks | Feb. 4, 1890 |
| 2,284,352 | Zank | May 26, 1942 |
| 2,770,287 | Christensen | Nov. 13, 1956 |

FOREIGN PATENTS

| | | |
|---|---|---|
| 29,969 | Great Britain | of 1910 |